Figure 1:
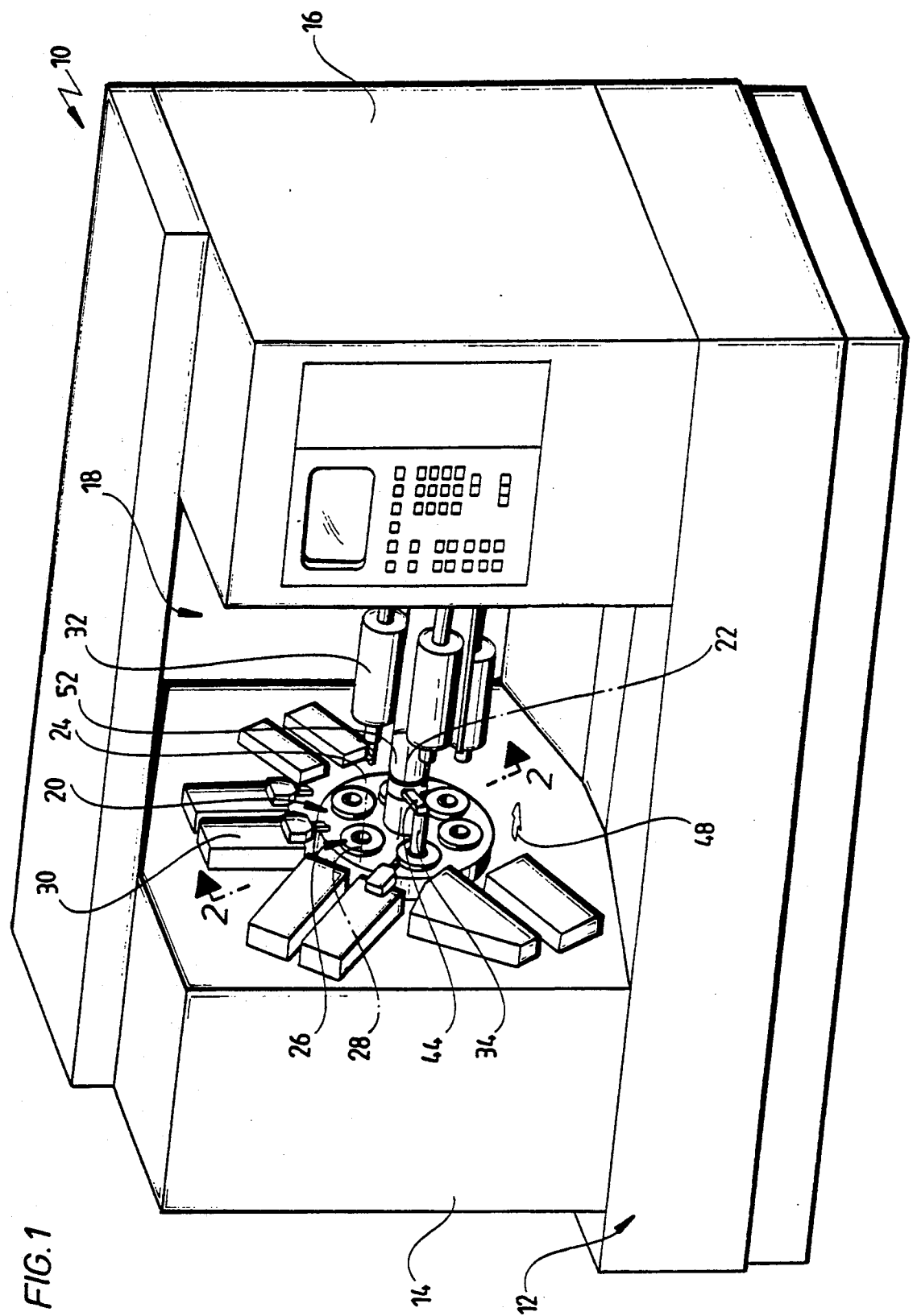

United States Patent [19]

Link et al.

[11] Patent Number: 5,099,730

[45] Date of Patent: Mar. 31, 1992

[54] MULTIPLE-SPINDLE AUTOMATIC LATHE WITH STOP

[75] Inventors: Helmut F. Link, Aichwald; Guenther H. Trautmann, Kirchheim-Nabern, both of Fed. Rep. of Germany

[73] Assignee: Index-Werke GmbH & Co. KG Hahn & Tessky, Fed. Rep. of Germany

[21] Appl. No.: 579,166

[22] Filed: Sep. 7, 1990

[30] Foreign Application Priority Data

Sep. 11, 1989 [DE] Fed. Rep. of Germany ....... 3930335

[51] Int. Cl.⁵ .......................... B23B 13/12; B23B 9/04
[52] U.S. Cl. ......................................... 82/153; 82/129
[58] Field of Search .................. 82/129, 153; 29/38 B

[56] References Cited

U.S. PATENT DOCUMENTS 3,221,580 12/1965 Millward ............................ 82/153
3,720,123  3/1973 Eichenhofer ..................... 82/129 X
3,722,334  3/1973 Schubert ........................... 82/129 X

FOREIGN PATENT DOCUMENTS 2519598 1/1976 Fed. Rep. of Germany .
158520 1/1983 German Democratic Rep. .

Primary Examiner—Steven C. Bishop
Attorney, Agent, or Firm—Neuman, Williams, Anderson & Olson

[57] ABSTRACT

In order to improve a multiple-spindle automatic lathe comprising a working area, a spindle drum having several spindles in different spindle positions, the spindles being adapted to be brought into different spindle stations on a machine frame by rotation of the spindle drum about a spindle drum axis, a bar stock feed means associated with at least one spindle, and a stop arranged in the working area and having a stop surface for bar stock, such that the stop can be arranged so as to save more space, it is proposed that the stop be mounted for rotation concentrically with the spindle drum axis, and that the stop be fixable relative to the spindle drum during bar stock feed in an initial position in which the stop surface intersects a feed direction of the bar stock located in the spindle position associated with this initial position.

35 Claims, 6 Drawing Sheets

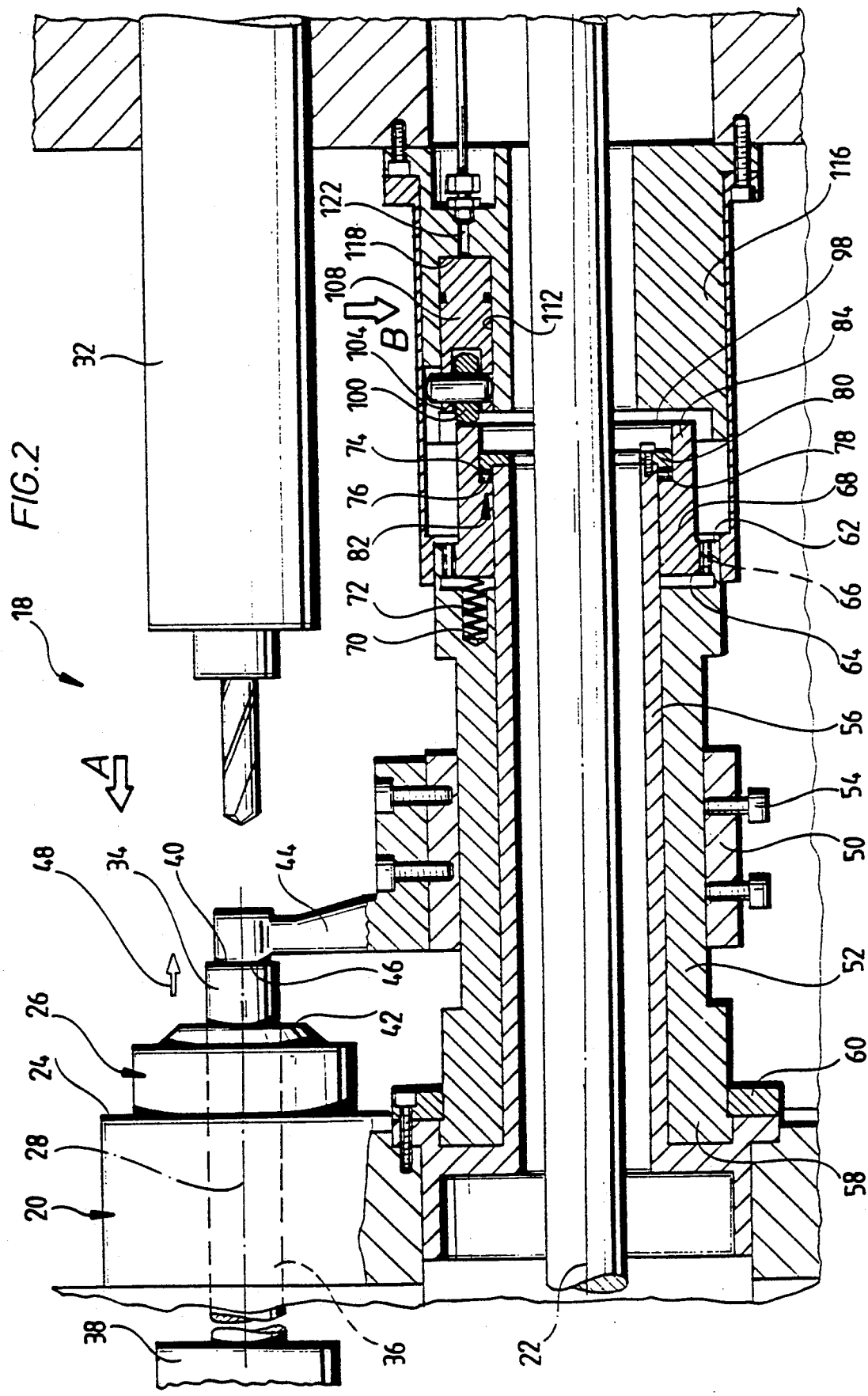

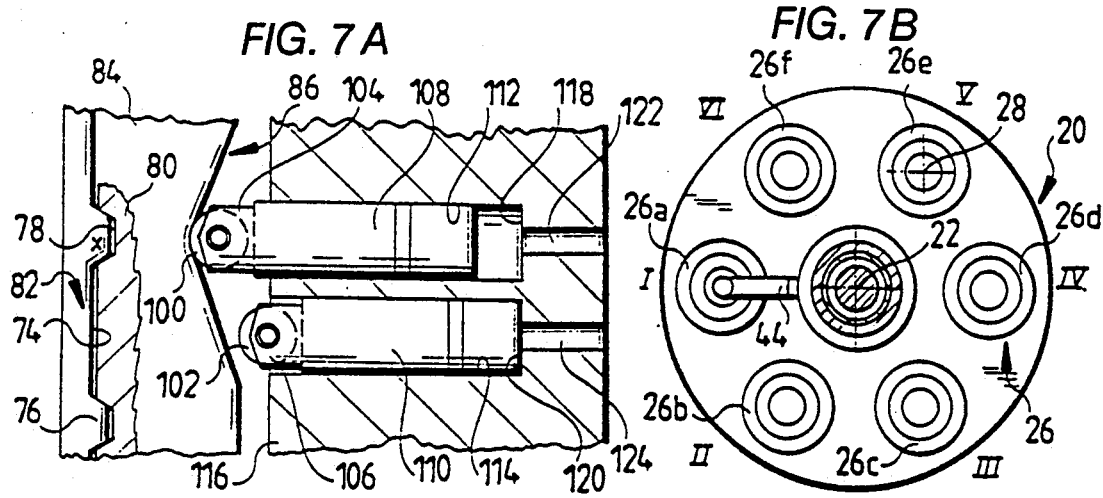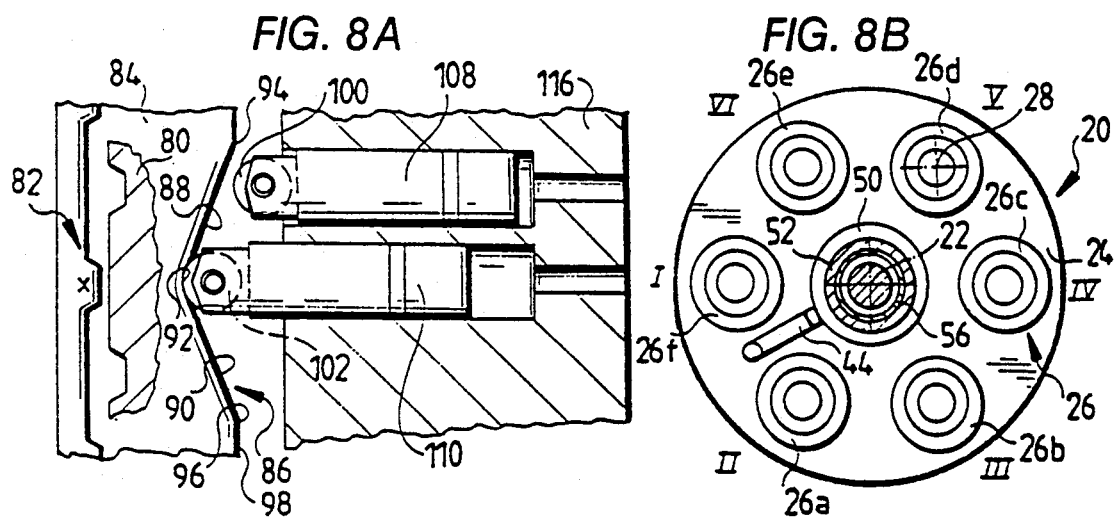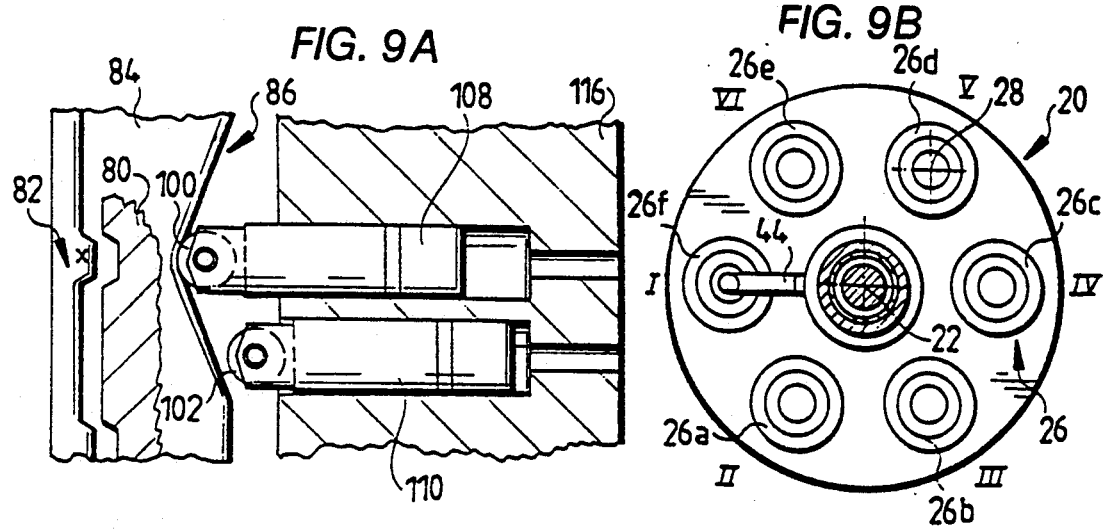

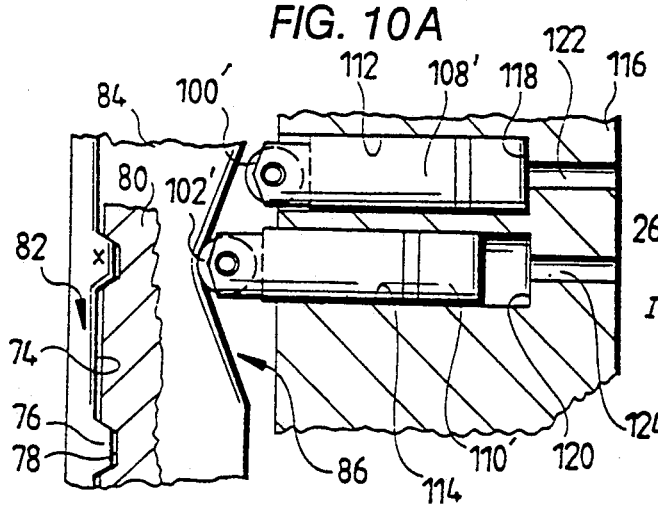
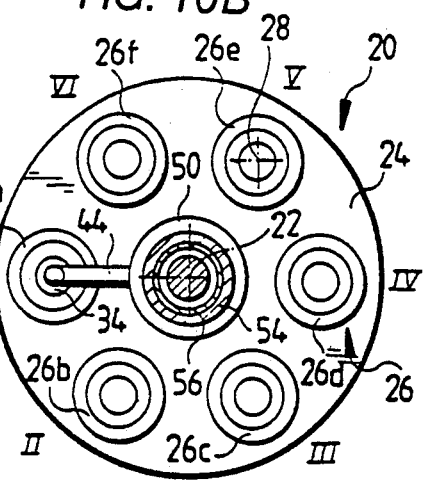
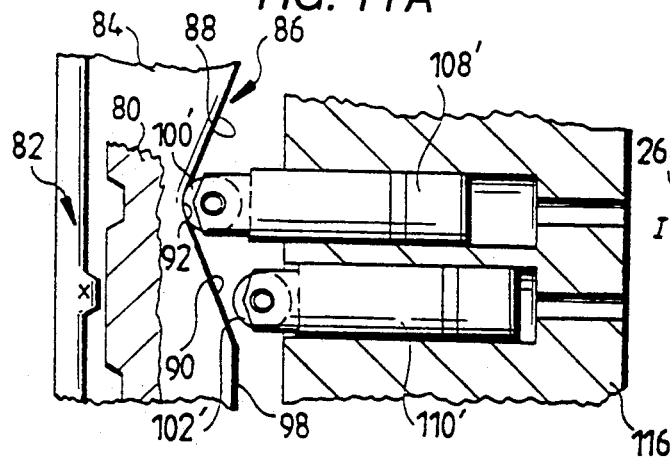
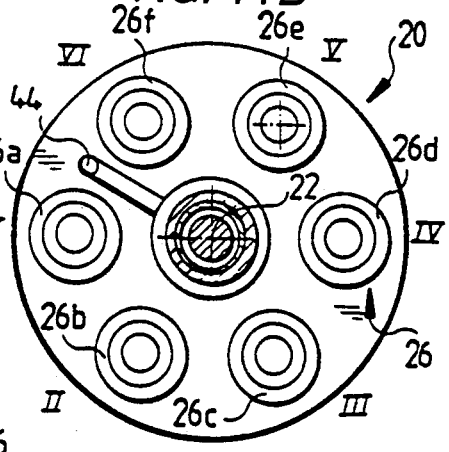
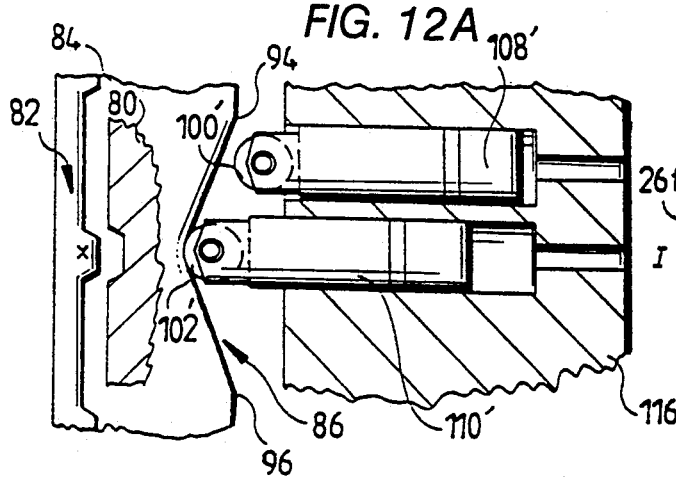
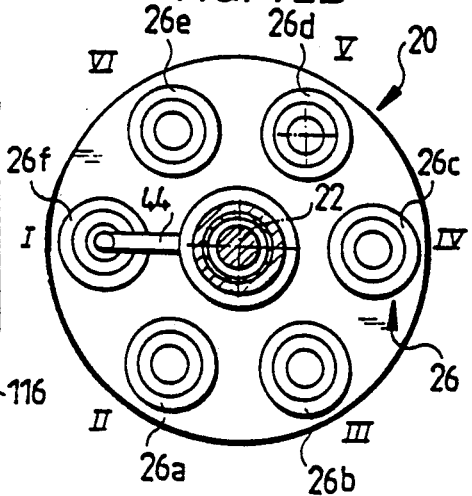

MULTIPLE-SPINDLE AUTOMATIC LATHE WITH STOP

The invention relates to a multiple-spindle automatic lathe comprising a working area, a spindle drum having several spindles in different spindle positions, the spindles being adapted to be brought into different spindle stations on the machine frame by rotation of the spindle drum about a spindle drum axis, a bar stock feed means associated with at least one spindle and a stop arranged in the working area and having a stop surface for the bar stock.

Such multiple-spindle automatic lathes are known, for example, from German published patent application No. 25 19 598.

Herein, the stop is fixedly arranged on the machine frame and can be driven into a corresponding position. The stop has a stop surface which extends over a certain angular area of the swivel motion of the spindle drum so the bar stock can be fed during indexing of the spindle drum.

Such stops have the disadvantage of requiring a lot of space in the working area and owing to the stop surface extending over a certain angular area have a large dimensional extent themselves, which has an adverse effect on the machining of the workpieces by tool carriers in the working area.

The object underlying the invention is, therefore, to improve a multiple-spindle automatic lathe of the kind described at the beginning by the stop being arranged so as to save more space.

This object is accomplished in accordance with the invention in a multiple-spindle automatic lathe of the kind described at the beginning by the stop being mounted for rotation concentrically with the spindle drum axis, and by the stop being fixable relative to the spindle drum during bar stock feed in an initial position in which the stop surface intersects a feed direction of the bar stock located in the spindle position associated with this initial position.

The advantage of rotatable mounting of the stop concentrically with the spindle drum axis is to be seen in the fact that the mounting of the stop in the area of the spindle drum axis does not cause a hindrance and, above all, does not hinder the machining with the tools associated with the individual spindle stations, that the stop can be rotated together with the spindle drum, and that there is also the possibility of bringing the stop into non-impeding intermediate positions between the spindle positions.

Furthermore, provision is expediently made for the stop to be transferrable to the initial position in a first spindle station. In other words, the transferral of the stop to the initial position always takes place in a first spindle station.

In order not to impede machining of the workpiece in the spindle positions, provision is expediently made for the stop to be fixable with the stop surface in an intermediate position between two spindle positions.

Swivel motion of the stop between the intermediate position and the initial position is preferably implemented by a reset drive by means of which the stop is movable.

It is also expedient for the stop to be fixable by the reset drive in the intermediate position in order to clear the spindle positions for the machining of the workpieces.

It has proven particularly expedient within the scope of the inventive solution for a rotary motion of the stop to be synchronizable with the rotation of the spindle drum. This is a decisive advantage of the inventive concept as the stop surface can then, in principle, be of point configuration and yet bar stock feed can still take place during rotation of the spindle drum and so abutment against the stop is possible throughout the entire duration of the rotation of the spindle drum. In particular, exact synchronization of the bar stock feed with the spindle drum indexing is thereby dispensed with. The stop surface is preferably of such dimensions that it corresponds at the most to a cross-sectional area of the bar stock.

Here it is most expedient for the rotary motion of the stop to be synchronizable with the rotation of the spindle drum in the indexing direction.

Within the scope of the inventive solution, an embodiment is particularly preferred wherein the stop is rotatable in the initial position out of the first spindle station in the direction of the following second spindle station synchronously with the spindle drum. Hence, for example, the bar stock feed can already be started while the spindle drum is still at a standstill and it need only be ensured that the bar stock feed occurs at a time during which the stop is in the initial position. This can take place at any time during the spindle indexing, i.e., during the rotation of the spindle drum.

In order for the stop not to be co-rotated arbitrarily, provision is made for the stop to be rotatable as far as an end station, this end station being an end station which is fixedly arranged on the machine frame.

The position of the end station fixed on the machine frame is expediently selected such that the end station is located at the most in the following spindle station, i.e., that rotation of the stop is from one spindle station to the next at the most.

It is, for example, conceivable for the end station to be located in the following spindle station. It is, however, also conceivable for the end station to be located before the next spindle station, in particular half-way between the first and the next spindle station.

Within the scope of the embodiments according to the invention, it is particularly expedient for the synchronous rotation of stop and spindle drum to be adapted to be terminated when the end station is reached. Since the end station is a position of the stop which is fixedly arranged on the machine frame and the intermediate position is defined in relation to the spindle position, the end station and the intermediate position can be placed apart or be identical. In any case, it is expedient for the stop to be transferrable to the intermediate position when the end station is reached so as not to cause a hindrance during subsequent machining of the workpieces in all spindle positions.

In a preferred embodiment, a reset drive is expediently provided for rotating the stop from the end station to the preceding spindle station so the stop can assume its initial position therein again and can act as stop for the bar stock feed of the next spindle standing in this first spindle station.

A solution wherein the reset drive operates hydraulically has proven expedient from a structural viewpoint.

To enable advantageous exploitation of the rotation of the spindle drum and, in particular, achieve synchronous rotation of the stop with the spindle drum, a structurally simple solution makes provision for the synchronous rotation of the stop to be implemented by a claw coupling between the stop and the spindle drum.

In conjunction with the reset drive, it has proven advantageous for the claw coupling to be disengageable upon actuation of the reset drive so the reset drive serves to move the stop in the direction opposite to the indexing direction of the spindle drum and motion of the stop in the indexing direction of the spindle drum occurs by a synchronous motion forced by the engaged claw coupling.

The engaged position of the claw coupling is easiest to secure by the claw coupling being acted upon by a spring in the direction of a coupled position.

In the description of the embodiments so far, details as to the way in which the stop is mounted were not given. It is particularly advantageous for the stop to be mounted on a central tube of the spindle drum which, in particular, extends through the working area.

From a structural viewpoint, the easiest way to implement mounting of the stop is for the stop to be carried by a swivel tube surrounding the central tube, with, for example, this swivel tube holding a stop arm carrying the stop surface.

In the description of the embodiments so far, further details were also not given as to the type of design of the reset drive. It is particularly advantageous for the reset drive to comprise a cam track and a track follower which are movable towards each other to rotate the stop. To enable defined positions to be approached with a re-set drive of such design, provision is advantageously made for the cam track to have a defined lowest point for the track follower.

A structurally compact solution is achievable by the cam track extending around the spindle drum axis and having a variable, curved configuration in the direction of the spindle drum axis.

In the simplest case, provision is made for the cam track to be arranged on a cam carrier and, in particular, for the cam carrier to be a ring extending concentrically with the spindle drum axis.

In a solution which is preferred from a structural viewpoint, the cam carrier is connected to the stop in a rotationally fixed manner but for displacement in the direction of the spindle drum axis. The easiest way to establish this connection is for the cam carrier to be connected in a rotationally fixed manner to the swivel tube but for displacement in the direction of the spindle drum axis.

A further structural simplification is achievable by the cam carrier carrying one element of the claw coupling, with the other element of the claw coupling preferably being arranged on the central tube.

Details of the way in which the track follower itself is to be arranged have still to be given. The track follower itself could, for example, likewise be rotatable with the spindle drum. A solution is particularly expedient in which the track follower is fixedly arranged on the machine frame. For actuation of the track follower, it has proven expedient for it to be arranged on one end of a hydraulic piston.

This hydraulic piston is expediently mounted in a housing ring which extends around the spindle drum axis and in a particularly compact embodiment is arranged as continuation of the central tube.

In the above explanation of advantageous embodiments of the present invention, the number of track followers to be provided was not specified. In the simplest case, one track follower is adequate for moving the stop back from the end station to the first spindle position.

However, in all of the cases in which an intermediate position is to be reached, it is particularly expedient for two track followers to be arranged in angular spaced relation to each other so that, for example, positioning of the stop in the intermediate position, controlled by the reset drive, can also be brought about with these cooperating with the cam track.

In a particularly preferred variant, provision is made for the angular spacing to correspond to half of the angular spacing of the spindle positions so that, for example, an intermediate position located half-way between the spindle positions can be approached with this reset drive.

In the simplest case, the cam track is designed so as to have inclined surfaces arranged in substantially V-shaped relation to each other.

In combination with the arrangement of the track followers, the outermost ends of the inclined surfaces of the cam track are expediently arranged so as to exhibit an angular spacing which corresponds to at least the angular spacing of the spindle positions.

In addition, it has proven purposeful for the outermost ends of the inclined surfaces to exhibit an angular spacing which is smaller than twice the angular spacing of the spindle positions.

In a further advantageous embodiment of the invention, the number of stops corresponds to the number of spindles provided with a bar stock feed means.

In particular, it is expedient for the stops to be seated on a common stop carrier.

Figure 3A:
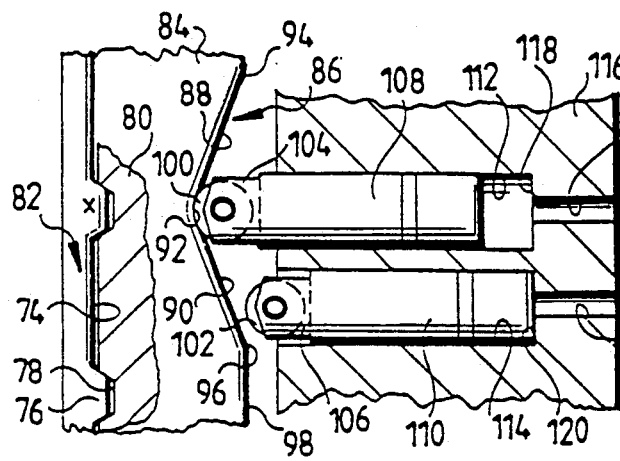
Figure 3B:
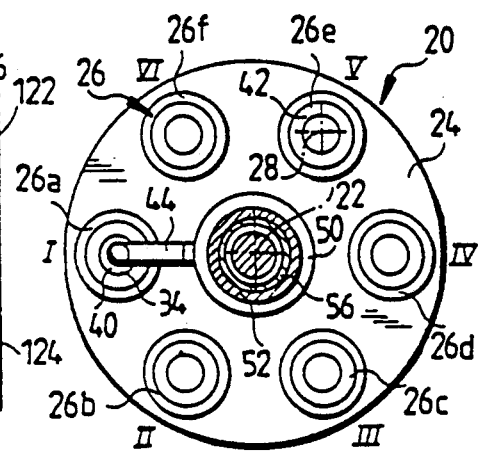
Figure 4A:
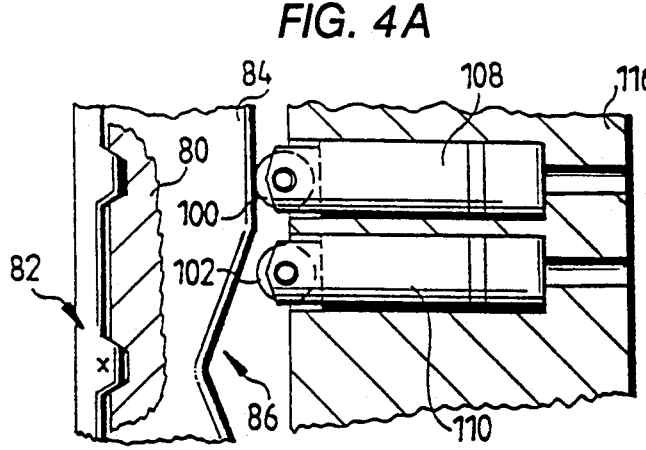
Figure 4B:
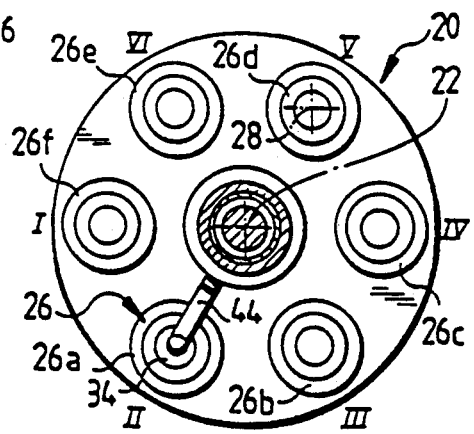
Figure 5A:
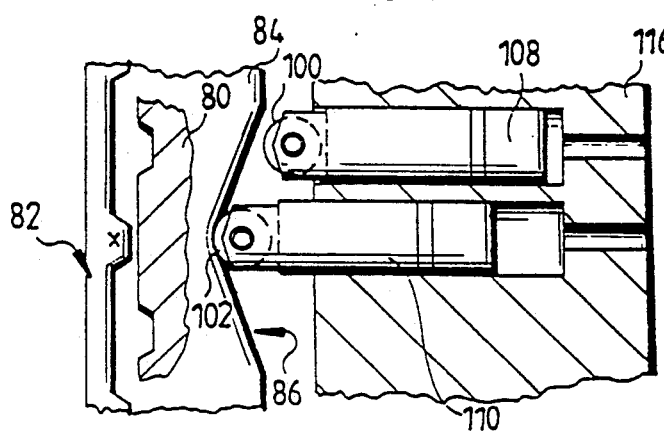
Figure 5B:
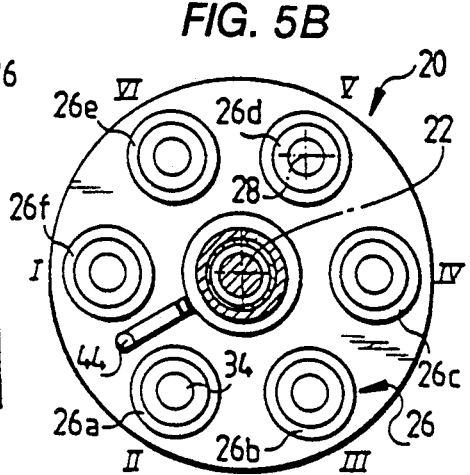
Figure 6A:
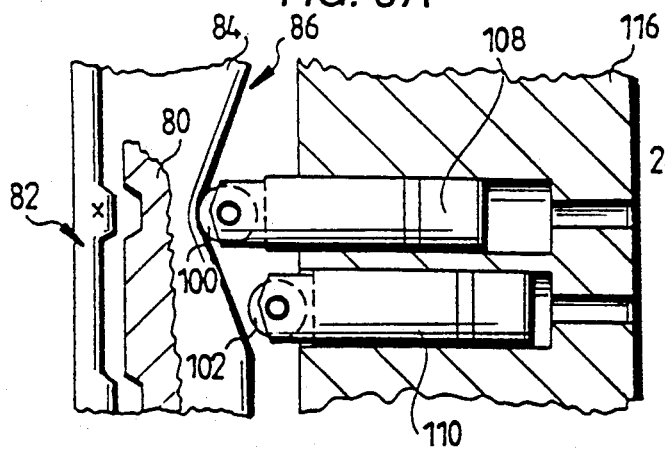
Figure 6B:
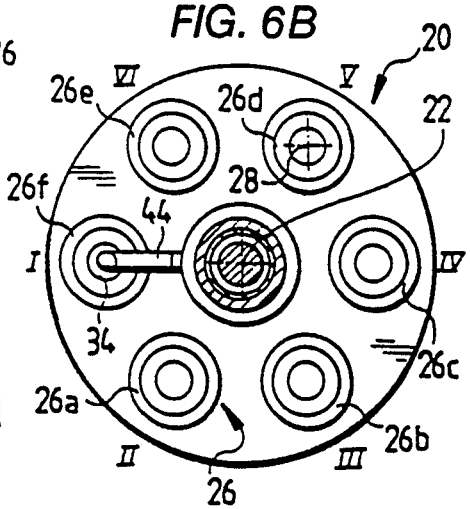

Further features and advantages are to be found in the following description and the appended drawings of an embodiment in several variants. The drawings show:

FIG. 1: a perspective view of a multiple-spindle automatic lathe according to the invention;

FIG. 2: a section along line 2—2 in FIG. 1;

FIGS. 3A to 6B: a partly sectional plan view in the direction of arrow A in FIG. 2, combined with a plan view of the spindle drum in the direction of arrow B in FIG. 2, with the stop arm in the initial position during spindle drum indexing from the first spindle station I to the second spindle station II illustrated in FIGS. 3A-3B and 4A-4B, an intermediate position of the stop arm illustrated in FIGS. 5A-5B, and a resetting of the stop arm to the initial position in the first spindle station I illustrated in FIGS. 6A-6B;

FIGS. 7A to 9B: an illustration similar to FIGS. 3A to 6B of a second way of actuating the multiple-spindle automatic lathe according to FIGS. 1 to 6B; and FIGS. 10A to 12B an illustration similar to FIGS. 3A to 6B of actuation of a variant of the first embodiment wherein synchronous motion of the stop arm with a spindle drum does not occur.

An embodiment designated in its entirety 10 of a multiple-spindle automatic lathe according to the invention comprises a machine frame 12 with a spindle drum housing 14 and a control system housing 16 arranged opposite the latter. A working area 18 is located between these. A spindle drum designated in its entirety 20 is mounted in the spindle drum housing 14 for rotation about a spindle drum axis 22 and arranged so as to face the working area 18 with a front face 24.

Several spindles 26 are mounted in this spindle drum 20 such that their spindle axis 28 extends parallel to the spindle drum axis 22. In the embodiment shown in the drawings, a total of six spindles 26, as illustrated in FIGS. 3 to 6, are arranged in a total of six spindle positions 26a to 26f arranged at the same angular spacing about the spindle drum axis 22 and at the same radial spacing from the spindle axis 22.

By rotation of the spindle drum 20 about the spindle drum axis 22, the individual spindle positions can be brought successively into different spindle stations I to VI fixedly arranged on the machine frame. For example, in FIGS. 3A-3B, spindle position 26a is in spindle station I, whereas in FIG. 4A-4B spindle position 26a is in spindle station II.

In the working area 18, one or several tool carriers 30 and 32, respectively, preferably in the form of longitudinal or compound slides, are associated with each spindle station.

In at least one spindle station I to VI, a new workpiece 34 to be machined is fed by bar stock 36 extending coaxially through the respective spindle 26 being advanced with a front end 40 by a bar stock feed means 38 beyond a front face 42 of the respective spindle 26 to such an extent that a new workpiece 34, starting from the front face 42 of the spindle 26 and extending in the direction of the spindle axis 28, is available for machining in the working area 18.

To enable defined fixing of the length of the workpiece 34 in the direction of the spindle axis 28, there is provided on a stop arm 44 in the working area 18 a stop surface 46 which extends in an initial position drawn in FIG. 2 transversely to a feed path of the bar stock 36, thereby intersecting the latter, so that when the bar stock 36 is advanced in the feed direction 48, the front end 40 strikes the stop surface 46 and thereby prevents further movement of the bar stock 36 in the feed direction 48.

The bar stock feed means 38 are, for example, designed as hydraulic bar stock feed means 38 which act continuously on the bar stock 36 with a constant force.

Hence the length of the workpiece 34 is determined by the spacing of the stop surface 46 from the front face 42 of the respective spindle 26.

The stop arm 44, for its part, is carried by a stop carrier ring 50 which is held on a swivel tube 52 so as to be fixable in different positions in the direction of the spindle drum axis 22. To fix the stop carrier ring 50 on the swivel tube 52, set screws 54 are, for example, provided for fixing the stop carrier ring 50 in a frictionally connected manner on the swivel tube 52.

The swivel tube 52, in turn, is carried by a central tube 56 which is rotationally fixedly connected to the spindle drum 20 and extends coaxially with the spindle drum axis 22 from the spindle drum housing 14 in the direction of the control system housing 16. The swivel tube 52 rests with an inside cylinder jacket surface directly on an outside cylinder jacket surface of the central tube 56 and has on its side facing the spindle drum housing 14 a flange attachment 58 which extends radially outwardly in relation to the spindle drum axis 22 and engages behind an annular flange 60 surrounding the swivel tube 52. The annular flange 60 fixes the flange attachment 58 for rotation about the spindle drum axis 22 but non-displaceably in the direction of the latter relative to the central tube 56 and hence also holds the stop carrier ring 50 held with the set screws 54 in a frictionally connected manner on the swivel tube 52 together with the stop arm 44 and the stop surface 46 non-displaceably in the direction of the spindle axis 22.

On its end 62 facing the control system housing 16, the swivel tube 52 is provided with an internal toothing 64 in which an external toothing 66 of a cam carrier 68 engages. The cam carrier 68, for its part, is mounted as a continuation of the swivel tube 52 for rotation on the central tube 56. The cam carrier 68 is displaceable in the direction of the spindle drum axis 22 relative to the swivel tube 52 but is rotationally fixedly connected to the latter.

Blind holes 70 which extend parallel to the spindle drum axis 22 and are open towards the control system housing 16 receive springs 72 which are supported on the swivel tube 52 and act upon the cam carrier 68 in the direction of the control system housing 16.

On its annular flange surface 74 facing the control system housing 16 and immediately adjoining the central tube 56 in the radial direction, the cam carrier 68 carries teeth 76 which point in the direction of the control system housing 16 and are engageable with correspondingly shaped recesses 78 of a delimiting flange 80 arranged at the end facing the control system housing 16 and protruding radially outwardly beyond the central tube 56.

The teeth 76 and the recesses 78 thereby form a claw coupling 82 with which a rotationally fixed connection can be established between the central tube 56, the delimiting flange 80 rotationally fixedly connected to the latter and the cam carrier 68 and hence also the swivel tube 52. With this claw coupling 82 it is, therefore, possible to swivel the stop arm 44 in synchronism with the rotation of the spindle drum 20.

Owing to the displaceability of the cam carrier 68 relative to the swivel tube 52 on account of the external and internal toothings 66, 64, it is possible to displace the cam carrier 68 so far in the direction of the spindle drum housing 14 that the claw coupling 82 disengages and hence the rotationally fixed connection between the central tube 56 and the swivel tube 52 is released.

A cam ring 84 provided radially outwardly of the annular flange surface 74 extends beyond the latter in the direction of the spindle drum axis 22 towards the control system housing 16. As shown in FIGS. 3A to 6B, the cam ring 84 comprises a cam track 86 which has a variable, curved configuration in the direction of the spindle drum axis 22 and extends around the spindle drum axis 22. The cam track 86 comprises, as shown in FIGS. 3A to 6B, two inclined surfaces 88 and 90 extending in V-shaped relation towards each other. The inclined surfaces 88 and 90 merge at a lowest point 92 and pass at their outermost ends 94 and 96 into an end face 98 of the cam ring 84 extending perpendicularly to the spindle drum axis 22.

The cam track 86 faces the control system housing 16.

Two track follower rolls 100 and 102 can be made to interact as track followers with this cam track 86. These are arranged at a rear end 104 and 106, respectively, of a hydraulic piston 108 and 110, respectively, facing the spindle drum housing 14. Each of the hydraulic pistons 108 and 110 is mounted in a piston bore 112 and 114 extending parallel to the spindle drum axis 22 in a housing ring 116 which, for its part, is mounted on the machine frame 12 in the working area 18 on the control system housing side.

The hydraulic pistons 108 and 110 protrude with their track follower rolls 100 and 102 over an end face 116 facing the spindle drum housing 14 in the direction of the cam track 86 so the piston bores 112 and 114 are open towards this side.

At their opposite end 118 and 120, respectively, facing the control system housing 16, a hydraulic channel 122 and 124, respectively, opens into the piston bores 112 and 114, respectively, for introduction of a hydraulic medium into the piston bores 112 and 114, respectively, so the hydraulic pistons 108 and 110 are thereby movable in the direction of the cam track 86 or in the direction opposite thereto.

The piston bores 112 and 114 are preferably arranged at the same radial spacing from the spindle drum axis 22 and at an angular spacing from each other which correspond to half of the angular spacing of successive spindle positions 26a to f of the spindle drum 20. In the embodiments shown in FIGS. 3A to 6B, the angular spacing of the piston bores 112 and 114 is 30 degrees with an angular spacing of successive spindle positions 26a, 26f of 60 degrees.

With their outermost ends 94 and 96, the inclined surfaces 88 and 90 of the cam track 86 have an angular spacing of slightly more than 60 degrees, i.e., an angular spacing which is slightly larger than that of successive spindle positions 26a to f.

As illustrated in FIGS. 3A to 6B, the inventive machine tool can be operated in the following way:

If the spindle drum 20 is standing with spindle position 26a in spindle station I, the stop arm 44 is moved with the stop surface 46 in front of the spindle 26 such that the stop surface 46 intersects the feed direction 48 of the bar stock 36. Hence the stop arm 44 is standing in the initial position and forms a feed stop for the feed motion of the bar stock 36.

The spindle drum 20 is then indexed so spindle position 26a stands in spindle station II, as shown in FIGS. 4A–4B. To this end, the two hydraulic pistons 108 and 110 are driven into their retracted position, i.e., the track followers 100 and 102 are not in contact with the cam track 86. Hence the cam carrier 68 is acted upon in the direction of the control system housing 16 by the springs 72, and the claw coupling 82 is in engagement so the teeth 76 engage the recesses 78. This means that during spindle drum indexing of spindle position 26a from spindle station I to spindle station II, the stop arm 44 is rotated synchronously with the spindle drum 20 and also into spindle station II which represents an end station for the swivel motion of the stop arm 44, and the stop surface 46 still stands in front of the spindle 26 seated in spindle position 26a and intersects the feed direction of the bar stock 36. Hence the stop arm 44 is also in the initial position following spindle drum indexing.

The hydraulic pistons 108 and 110 are arranged relative to the cam track 86 such that when spindle position 26a is standing in spindle station I, the lowest point 92 is in alignment with the track follower 100. Since spindle position 26a stands in spindle station II after spindle drum indexing, rotation through 60 degrees has occurred. Since the spacing of the outermost end 94 from the lowest point 92 is half of the spacing of the outermost ends 94 and 96 of the inclined surfaces 88 and 90 and hence this angular spacing is larger than 30 degrees, in the position shown in FIGS. 4A–4B the track follower 102 is still able to act upon the inclined surface 88 between its outermost end 94 and the lowest point 92 and, in addition, the track follower 102 has an angular spacing of 30 degrees from the lowest point 92. If the hydraulic piston 110 is moved in the direction of the cam track 86, it acts upon the inclined surface 88, which does, however, not result in relative rotation of the cam carrier 68 so long as the claw coupling 82 is in engagement. However, since the claw coupling 82 is simultaneously disengageable by the cam carrier 68 being acted upon in the direction of the spindle drum axis 22 and in the direction of the spindle drum housing 14, the hydraulic piston 110 brings about displacement of the cam carrier 68 in the direction towards the spindle drum housing 14 and hence firstly disengagement of the claw coupling 82 and subsequently, owing to the inclined surface 88, rotation of the cam carrier 68, more specifically, so far that the track follower roll 102 stands at the lowest point 92 of the cam track 86.

Since the angular spacing of the track follower roll 102 from the lowest point 92, as shown in FIGS. 4A–4B, was 30 degrees, the reaching of the lowest point 92 by the track follower roll 102, as shown in FIGS. 5A–5B, results in the stop arm 44 being turned back through 30 degrees. Hence the stop arm 44 lies in an intermediate position between the spindle positions 26a and 26f. Without the spindle drum 20 having been rotated further, it is now possible, as shown in FIGS. 5A–5B, for the machining of the workpieces 34 to be carried out in all spindle positions 26a to f and, for example, for the workpiece 34 standing in spindle position 26f and spindle station I to be cut off and either removed or changed over for further machining.

After these machining steps, the stop arm 44 is swivelled further back into spindle station I, more specifically, into an initial position in front of spindle position 26f.

To this end, after the lowest point 92 has been reached by the track follower roll 102, the hydraulic piston 108 is actuated and the hydraulic piston 110 retracted, which results in the track follower roll 100 likewise coming to rest against the inclined surface 88, still acting upon the cam carrier 68 in the direction towards the spindle drum housing 14 and simultaneously causing the stop arm 44 to be turned back through a further 30 degrees. This turning back of the spindle arm 44 through 30 degrees, which has now occurred twice, constitutes a total turning back through 60 degrees so the coupling 82 is engageable again owing to the teeth 76 being in alignment with the recesses 78 again, provided all of the recesses 78 successively exhibit an angular spacing of 60 degrees and likewise the teeth 76. This position is shown in FIGS. 6A–6B. After the initial position of the stop arm 44 has been reached, the hydraulic piston 108 can now also be retracted and the claw coupling 82 will engage so that upon the next spindle drum indexing, the stop arm 44 will remain in its initial position and be rotated further in synchronism with the indexing spindle drum 20.

This position is again shown in FIGS. 3A–3B so the previously described procedures can start anew.

Hence with this synchronous further rotation of the stop arm 44 with the spindle drum, it is possible for the bar stock 36 to be advanced by the bar stock feed means 38 during the entire indexing time of the spindle drum and, therefore, for these indexing times to also be exploited for the feed motion. The stop surface 46 can be kept very small and have at the most a cross-sectional area which corresponds to that of the bar stock 36. There is also the possibility of moving the stop surface 46 into the intermediate position, as shown in FIGS. 5A–5B, so machining is possible in all spindle positions 26a to f without the stop arm 44 causing a hindrance.

A further possibility of operating the inventive machine tool is shown in FIGS. 7A to 9B. The starting point is exactly the same as in the first variant so the positions in FIGS. 7A–7B are identical with the positions in FIGS. 3A–3B. This means that the stop arm 44 in FIG. 7A–7B is standing in its initial position in front of spindle position 26a in spindle station I. When, in this initial position, the spindle drum is indexed out of spindle station I into spindle station II, during the drum indexing the hydraulic piston 110 is actuated and moved in the direction towards the cam track 86 so that the track follower roll 102 already acts upon the inclined surfaces 88 or 90 during the spindle drum indexing and disengages the claw coupling 82 and, consequently, during the spindle drum indexing the stop arm 44 is held in an end position which at the same time is the intermediate position in which the stop arm 44 stands half-way between the spindle positions 26a and 26f after completion of the spindle drum indexing, with the track follower 102 being located at the lowest point 92 of the cam track 86 and holding the stop arm 44 in the intermediate position.

Starting from this intermediate position, the procedure is the same as in the previous mode of operation, i.e., the hydraulic piston 108 is moved in the direction of the spindle drum housing 14 and the hydraulic piston 110 is retracted so that the track follower roll 100 acts upon the inclined surface 88, continues to keep the claw coupling 82 in disengagement and moves the cam carrier 68 back in the direction opposite to the direction of which the stop surface 46 is standing in front of spindle position 26f. After this position has been reached, the hydraulic piston 108 is also retracted so that the claw coupling 82 engages again and synchronous rotation of the stop arm 44 with the spindle drum 20 can take place anew.

As an alternative to the mode of operation shown in FIGS. 7A to 9B, there is also the possibility of arranging the hydraulic pistons 108' and 110' such that the track follower roll 102' is in alignment in the initial position with the lowest point 92 while the hydraulic piston 108' is offset through 30 degrees in the direction opposite to the indexing direction. It is then possible, starting from an initial position, as shown in FIGS. 10A–10B, to first swivel the stop arm 44 back in the direction opposite to the direction in which the drum is indexed, more specifically, by displacement of the hydraulic piston 108' in the direction of the spindle drum housing 14 and retraction of the hydraulic piston 110'. The track follower roll 100' thereby comes to rest against the inclined surface 88, disengages the claw coupling 82 and rotates the cam carrier 68 in the direction opposite to the indexing direction so the stop arm 44 stands in an intermediate position between the spindle positions 26a and 26f, as shown in FIGS. 11A–11B. The claw coupling 82 remains disengaged.

In order to prevent collision of the stop arm 44 with the workpiece in spindle position 26f during spindle drum indexing, the hydraulic piston 110' can be moved in the direction of the spindle drum housing 14 towards the cam track 86 and the piston 108' retracted during the spindle drum indexing so the cam carrier 68 is rotated through 30 degrees in the direction of the spindle drum indexing and so, as shown in FIGS. 12A–12B, the stop arm 44 finally stands in its initial position in front of the spindle position 26f again, in which, for example, engagement of the claw coupling again is conceivable.

With this mode of operation, the bar stock 36 cannot be fed during the spindle drum indexing, this only being possible when the spindle drum 20 is standing in one of spindle positions 26a to f.

What is claimed is:

1. A multiple-spindle automatic lathe having a working area and comprising a rotatable spindle drum having a plurality of spindles in different spindle positions; means for moving said spindles into different spindle stations on a machine frame by rotation of said spindle drum about a spindle drum axis; bar stock feed means associated with at least one spindle; a stop arranged in said working area and having a stop surface for a bar stock fed by said bar stock feed means; said stop being mounted for rotation concentrically about said spindle drum axis, and being fixable relative to said spindle drum during the feeding of said bar stock by said bar stock feed means in an initial position; said stop surface intersecting a feed direction of said bar stock located in said spindle position associated with said initial position.

2. A multiple-spindle automatic lathe as defined in claim 1, wherein said stop is transferrable to said initial position in a first spindle station.

3. A multiple-spindle automatic lathe as defined in claim 1, wherein said stop is fixably positionable with said stop surface in an intermediate position between two spindle positions.

4. A multiple-spindle automatic lathe as defined in claim 3, wherein said stop can be swivelled from said initial position to said intermediate position by a reset means.

5. A multiple-spindle automatic lathe as defined in claim 4, wherein said stop is fixable in said intermediate position by said reset means.

6. A multiple-spindle automatic lathe as defined in claim 1, wherein rotary motion of said stop is synchronizable with the rotation of said spindle drum.

7. A multiple-spindle automatic lathe as defined in claim 1, wherein said stop is rotatable in said initial position out of said first spindle station in the direction of a following second spindle station synchronously with said spindle drum.

8. A multiple-spindle automatic lathe as defined in claim 7, wherein said stop is rotatable as far as an end station.

9. A multiple-spindle automatic lathe as defined in claim 8, wherein said end station is located in the next spindle station.

10. A multiple-spindle automatic lathe as defined in claim 8, wherein said synchronous rotation of stop and spindle drum is terminated when said end station is reached.

11. A multiple-spindle automatic lathe is defined in claim 10, wherein said stop is transferrable to said intermediate position when said end station is reached.

12. A multiple-spindle automatic lathe as defined in claim 8, wherein a reset means is provided for rotating said stop from said end station to the preceding spindle station.

13. A multiple-spindle automatic lathe as defined in claim 4, wherein said reset means is hydraulically driven.

14. A multiple-spindle automatic lathe as defined in claim 6, wherein said synchronous rotation of said stop is effected by a claw coupling between said stop and said spindle drum.

15. A multiple-spindle automatic lathe as defined in claim 14, wherein said claw coupling is disengageable upon actuation of a reset means.

16. A multiple-spindle automatic lathe as defined in claim 14, wherein said claw coupling is biased by a spring in the direction of a coupled position.

17. A multiple-spindle automatic lathe as defined in claim 1, wherein said stop is mounted on a central tube of said spindle drum.

18. A multiple-spindle automatic lathe as defined in claim 17, wherein said stop is carried by a swivel tube surrounding said central tube.

19. A multiple-spindle automatic lathe as defined in claim 4, wherein said reset means comprises a cam track and a track followed which are movable towards each other for rotation of said stop.

20. A multiple-spindle automatic lathe as defined in claim 19, wherein said cam track has a defined lowest point for reception of said track follower.

21. A multiple-spindle automatic lathe as defined in claim 19, wherein said cam track extends around said spindle drum axis and has a variable, curved configuration in the direction of said spindle drum axis.

22. A multiple-spindle automatic lathe as defined in claim 19, wherein said cam track is arranged on a cam carrier.

23. A multiple-spindle automatic lathe as defined in claim 22, wherein said cam carrier is a ring which extends concentrically with said spindle drum axis.

24. A multiple-spindle automatic lathe as defined in claim 22, wherein said cam carrier is connected to said stop in a rotationally fixed manner but is displaceable relative to said cam carrier in the direction of said spindle drum axis.

25. A multiple-spindle automatic lathe as defined in claim 22, wherein said cam carrier carries one element of a coupling, for disengageably coupling said stop and said spindle drum.

26. A multiple-spindle automatic lathe as defined in claim 19, wherein said track follower is fixedly arranged on said machine frame.

27. A multiple-spindle automatic lathe as defined in claim 19, wherein said track follower is arranged on one end of a hydraulic piston.

28. A multiple-spindle automatic lathe as defined in claim 27, wherein said hydraulic piston is mounted in a housing ring extending around said spindle drum axis.

29. A multiple-spindle automatic lathe as defined in claim 19, wherein two track followers are arranged in angular spaced relation to each other.

30. A multiple-spindle automatic lathe as defined in claim 29, wherein said angular spacing corresponds to half of the angular spacing of successive spindle positions.

31. A multiple-spindle automatic lathe as defined in claim 19, wherein said cam track has inclined surfaces arranged is substantially V-shaped relation to each other.

32. A multiple-spindle automatic lathe as defined in claim 31, wherein the outermost ends of said inclined surfaces of said cam track define an angular spacing which corresponds to at least the angular spacing of successive spindle positions.

33. A multiple-spindle automatic lathe as defined in claim 1, wherein said stop is non-displaceably fixable in the direction of said spindle drum axis.

34. A multiple-spindle automatic lathe as defined in claim 1, wherein the number of stops corresponds to the number of spindles provided with a bar stock feed means.

35. A multiple-spindle automatic lathe as defined in claim 34, wherein said stops are seated on a common stop carrier.

* * * * *